US009546315B2

(12) United States Patent
Pollard et al.

(10) Patent No.: US 9,546,315 B2
(45) Date of Patent: *Jan. 17, 2017

(54) COMPOSITIONS, METHODS, APPARATUS, AND SYSTEMS FOR INCORPORATING BIO-DERIVED MATERIALS IN DRILLING AND HYDRAULIC FRACTURING

(75) Inventors: Anthony J. S. Pollard, Ames, IA (US); Dennis S. Banasiak, Urbandale, IA (US); Cody J. Ellens, Ankeny, IA (US); Jared N. Brown, Ankeny, IA (US)

(73) Assignee: AVELLO BIOENERGY, INC., Des Moines, IA (US)

( * ) Notice: Subject to any disclaimer, the term of this patent is extended or adjusted under 35 U.S.C. 154(b) by 930 days.

This patent is subject to a terminal disclaimer.

(21) Appl. No.: 13/480,207

(22) Filed: May 24, 2012

(65) Prior Publication Data

US 2012/0302470 A1 Nov. 29, 2012

Related U.S. Application Data

(60) Provisional application No. 61/491,188, filed on May 28, 2011.

(51) Int. Cl.
*C09K 8/68* (2006.01)
*C09K 8/52* (2006.01)
(Continued)

(52) U.S. Cl.
CPC . *C09K 8/52* (2013.01); *C09K 8/68* (2013.01); *C09K 8/72* (2013.01); *C09K 8/86* (2013.01);
(Continued)

(58) Field of Classification Search
None
See application file for complete search history.

(56) References Cited

U.S. PATENT DOCUMENTS 2,335,689 A * 11/1943 Morgan et al. ............... 507/264
3,593,790 A * 7/1971 Herce .......................... 166/267
(Continued)

FOREIGN PATENT DOCUMENTS

EP 1728771 A2 2/2011
WO 2010033512 A1 3/2010

OTHER PUBLICATIONS

"The Acidity of Phenol" Jim Clark, 2004.*
(Continued)

*Primary Examiner* — Jeffrey Washville
(74) *Attorney, Agent, or Firm* — O'Connor & Company

(57) ABSTRACT

The present invention provides compositions, methods, apparatus, and systems to minimize environmental impact, water use, and overall cost of drilling and hydraulic fracturing for crude oil and natural gas. Some variations of the invention provide a fracturing-fluid additive composition comprising a water-soluble portion of a biomass-pyrolysis liquid. In some embodiments, the fracturing-fluid additive composition is substantially biodegradable and is not toxic. Some variations provide improved proppants for oil or gas well fracturing. Other variations of this invention relate to drilling-fluid additive compositions, and methods of using these compositions. This invention can significantly improve the environmental, economic, and social sustainability associated with drilling and fracturing for production of oil and gas.

20 Claims, 3 Drawing Sheets

(51) Int. Cl.
  *C09K 8/80* (2006.01)
  *C09K 8/72* (2006.01)
  *C09K 8/86* (2006.01)

(52) U.S. Cl.
  CPC ....... *C09K 2208/26* (2013.01); *C09K 2208/32* (2013.01)

(56) References Cited

U.S. PATENT DOCUMENTS

| | | | |
|---|---|---|---|
| 5,067,566 A | | 11/1991 | Dawson |
| 5,565,416 A | * | 10/1996 | Wu .............................. 507/103 |
| 5,614,475 A | | 3/1997 | Moorhouse et al. |
| 5,624,886 A | | 4/1997 | Dawson et al. |
| 5,639,715 A | | 6/1997 | Patel |
| 5,678,632 A | | 10/1997 | Moses et al. |
| 7,231,976 B2 | * | 6/2007 | Berry ...................... C09K 8/40 166/291 |
| 8,334,356 B1 | * | 12/2012 | Nowak ................... C08L 83/04 528/28 |
| 2003/0119678 A1 | * | 6/2003 | Crews ........................... 507/100 |
| 2010/0081585 A1 | * | 4/2010 | Fallon ........................... 507/201 |
| 2011/0092726 A1 | * | 4/2011 | Clarke ................... C12M 21/02 554/175 |
| 2011/0277378 A1 | * | 11/2011 | Von Hebel et al. ............. 44/436 |
| 2012/0247763 A1 | * | 10/2012 | Rakitsky ................. C04B 24/08 166/279 |

OTHER PUBLICATIONS

International Search Report in PCT patent application, dated Dec. 10, 2012.

Lucia Garcia, R. F. (2000). Catalytic steam reforming of bio-oils for the production of hydrogen: effects of catalyst composition. Applied Catalysis A: General , 201, 225-239.

Tushar P. Vispute, G. W. (2009). Production of hydrogen, alkanes and polyols by aqueous phase processing of wood-derived pyrolysis oils. Green Chemistry , 11 (94), 1433-1445.

* cited by examiner

Fig. 3

| Chemical | wt% |
|---|---|
| Water: | 0 - 90 |
| Levoglucosan: | 0 - 30 |
| Hydroxyacetone: | 0 - 30 |
| Carboxylic acids: | 0 - 25 |
| Furans: | 0 - 18 |
| Phenolics: | 0 - 24 |
| Guaiacols: | 0 - 15 |
| Syringols: | 0 - 18 |
| Other light organics: | 0 - 50 |

COMPOSITIONS, METHODS, APPARATUS, AND SYSTEMS FOR INCORPORATING BIO-DERIVED MATERIALS IN DRILLING AND HYDRAULIC FRACTURING

PRIORITY DATA

This patent application claims priority under 35 U.S.C. §120 from U.S. Provisional Patent Application No. 61/491,188, filed May 28, 2011, the disclosure of which is hereby incorporated by reference herein for all purposes.

FIELD OF THE INVENTION

The present invention generally relates to compositions, methods, apparatus, and systems for drilling and hydraulic fracturing of wells.

BACKGROUND OF THE INVENTION

Oil and natural gas are common fossil-based resources used for the production of transportation fuels, heat and power, materials, chemicals, adhesives, pharmaceuticals, polymers, fibers and other products. Since the first oil well drilled in 1859 and the introduction of the internal combustion engine, the United States has been a major producer and consumer of fossil resources (Drake Well Museum, 2012).

In 2010, the US produced over 2 billion barrels of oil and 26.8 trillion cubic feet of natural gas worth over $180 and $110 billion, respectively. A significant amount of this production can be attributed to advances in horizontal drilling and hydraulic fracturing. Previously unrecoverable deposits have been freed up ensuring access to decades of domestic natural gas and oil. In fact, without hydraulic fracturing, 17% of oil and 45% of natural gas production would be lost within five years (IHS Global Insight, 2009).

Oil and natural gas deposits are located all across the United States and the World. It is estimated that the total amount of technically recoverable natural gas resources worldwide is 22,600 trillion cubic feet of which shale gas is 6,622 trillion cubic feet or nearly 30% (U.S. Department of Energy and Energy Information Administration, 2011). Wells are drilled hundreds of meters deep in order to gain access to the resources. Once drilled, new wells or old unproductive wells are hydraulically fractured to stimulate production.

Drilling fluids or muds are used during the initial well bore to cool the bit, lubricate the drill string, suspend and transport cuttings, control hydrostatic pressure and maintain stability. Drilling fluids are typically water- or oil-based but can be pneumatic. Water or oil is the main ingredient in liquid drilling fluids. Barite, clay, polymers, thinners, surfactants, inorganic chemicals, bridging materials, lost circulation materials and specialized chemicals are also added to engineer drilling fluid properties. Drilling fluids make up between 5-15% of drilling costs (Ben Bloys, 1994).

Hydraulic fracturing was developed in the 1940's to increase productivity of oil and gas wells. Hydraulic fracturing creates and maintains cracks within oil and gas formations providing a clear path for oil and gas to flow. Fracturing can be performed in vertical and horizontal wells. During a fracturing operation, perforations are made through cement casing into the oil and gas formation using explosive charges. Fracturing fluids are injected into the well at high pressures to create new cracks while further expanding and elongating the cracks formed by the explosives (American Petroleum Institute, 2010).

Fracturing fluids are composed primarily of water (87-94%) and proppant such as sand (4-9%). Sand mixed with the fracturing fluids is used to prop open formation cracks and maintain a clear path for oil and natural gas. The remaining fracturing fluid (0.5-3%) is composed of chemicals that aid the fracturing process. Chemical additives are mixed into the drilling fluid depending on the well and formation properties. Chemicals are used to dissolve minerals, reduce friction, prevent scaling, maintain fluid properties (viscosity, pH, etc.), eliminate bacteria (biocide), suspend the sand, prevent precipitation of metal oxides, prevent corrosion, stabilize fluid, formation and wellbore, thicken fluid (gelling agent) and breakdown the gel (breaker) (American Petroleum Institute, 2010).

Hydraulic fracturing fluid is made in a step-wise procedure and carefully engineered to accomplish the fracking process. In its most basic form, a gelling agent such as gaur gum is first added to water and hydrated. Next a breaker (oxidant or enzyme) is added which will break the gel bonds after being pumped into the well. A crosslinking agent such as borate is then added to the solution which immediately forms a viscous, gelled solution. The purpose of the gel is to suspend the proppant while being pumped into the well where it is wedged into formation fractures propping them apart.

Eventually the fracturing fluid must be removed from the well leaving the proppant in the fractures to maintain open channels for oil or gas to flow through. In order to pump the fracturing fluid out of the well and leave the proppant behind the viscous gel must be broken down to a viscosity less than 100 cP. Since the fracturing fluid is pumped into the well in stages, precise amounts of breaker are mixed with the fracturing fluid to break the entire gel solution simultaneously. Once the entire gel is broken the fracturing fluid is pumped back to the surface where it is stored in retention ponds or hauled away from the well for treatment and disposal.

One of the challenges associated with drilling and hydraulic fracturing is in using oil-based fluids. Oil-based fluids are subject to environmental scrutiny and are costly since they may include substantial quantities of refined petrochemicals or fuels, such as diesel fuel.

Another challenge associated with drilling and hydraulic fracturing is reducing the amount of water used in the process. Depending on how deep the well is, millions of gallons of water may be used during both drilling and hydraulic fracturing (Ground Water Protection Council and ALL Consulting, 2009). Recovered fluid is stored in open retention ponds where it is left to settle and evaporate or trucked out to be treated. In some cases, fluid is lost underground.

Another challenge associated with drilling and hydraulic fracturing arises from the retention ponds themselves. Retention ponds contain the recovered fluid, chemicals and cuttings from the well. Retention ponds may be a source of ground water contamination if the containment area gives way or the liner is pierced. Retention ponds also pose risks to wildlife if exposed to chemicals. Furthermore, if wells are planned in environmentally sensitive areas, retention ponds may not be permitted. In this case cuttings and recovered fluids and chemicals must be transported from site for treatment.

A criticism with drilling and hydraulic fracturing relates to the types of chemicals used during the process and the hazards they may pose. Though usually less than a couple percent of the entire fluid, common chemical additives include hydrochloric acid, formic acid, citric acid, boric acid, acetic acid, lauryl sulfate, polyacrylamide, ethylene glycol, borate salts, potassium carbonate, potassium chloride, glutaraldehyde, guar gum, isopropanol, petroleum distillates, sodium chloride, methanol and 2-butoxyethanol.

Another criticism associated with drilling and hydraulic fracturing is that groundwater contamination may occur in underground aquifers. During drilling and hydraulic fracturing, cement and steel casing is placed in the wellbore as a boundary between aquifers and the production material. Nonetheless, many have complained about chemicals found in drinking water and blame drilling and hydraulic fracturing. The Environmental Protection Agency and other agencies are investigating if and how drilling and hydraulic fracturing are linked with ground water contamination (Environmental Protection Agency, 2009).

Another criticism associated with hydraulic fracturing is ground water contaminated with natural gas. Landowners cite detectible amounts of thermogenic methane in drinking water that contribute to poor health of livestock and humans (Stephan G. Osborn, 2011).

In U.S. Pat. No. 5,067,566 (Nov. 26, 1991) a subterranean formation fracturing method is disclosed where a hydratable polymer, crosslinking agent and breaker are combined to form a fracturing fluid. A pH regulating substance is added to the fluid which slowly hydrolyzes forming an acid so that the breaker is activated and can control the breaking point of the polymer gel. The patent notes that one of the challenges with breakers is that they are difficult to control such that the entire gel is broken simultaneously. Oxidant breakers are ineffective at temperatures below 55° C. without added coreactants and, although enzyme breakers can be used at lower temperatures, they are sensitive to pH. The invention seeks to improve upon these breakers, however it requires an additional pH regulating substance for enzymatic breakers to be effective.

In U.S. Pat. No. 5,624,886 (Apr. 29, 1997) a subterranean formation fracturing method is disclosed where a hydratable polymer, crosslinking agent and breaker are combined to form a fracturing fluid. The breaker is made of an insoluble oxidant and formed as a pellet. However, the insoluble breaker is not evenly mixed with the fracturing fluid which may prevent even breaking throughout the fluid. Furthermore, a solid, insoluble, pelletized breaker is costly to manufacture and difficult to incorporate into liquid fracturing fluids.

In U.S. Pat. No. 7,231,976 (Jun. 19, 2007) a method of treating a well with a biodegradable fluid consisting of a lactic acid ester and a fatty acid ester is disclosed. The biodegradable fluid may be emulsified with alcohol and water using emulsifiers and used to remove pipe dope, hydrocarbons and drilling muds. Furthermore, the biodegradable fluid may act as a breaker catalyst to decrease the viscosity of fracturing fluids or replace synthetic and oil based drilling muds. However, forming an emulsion adds increased complexity and cost to a drilling and fracturing operation.

In U.S. Pat. No. 5,678,632 (Oct. 21, 1997) a method of acidizing an underground reservoir by injecting a substrate and enzyme which converts the substrate into an organic acid is disclosed. However, it is noted that the enzyme may be inactive under certain temperatures, pressures and environments and fail to treat the reservoir.

In U.S. Pat. No. 5,639,715 (Jun. 17, 1997) an environmentally non-toxic drilling fluid is disclosed. The drilling fluid is made in part from a surfactant that imparts anti-bit balling, lubricity, salt tolerance and non-toxic properties. However, the non-toxic surfactant is only an additive to the drilling fluid which may include other toxic compounds.

What are needed in the art are methods or products that minimize environmental impact, scrutiny, water-use and costs of drilling, treating and hydraulic fracturing for oil and gas. Furthermore, products that are environmentally benign, have reduced toxicity and do not contaminate drinking water are needed. A preferred fast pyrolysis process that converts biomass into renewable bio-oil fractions and carbon-rich biochar will reduce water use, hazardous chemicals and fluid cost while improving the environmental sustainability of drilling, treating and hydraulic fracturing for oil and gas.

SUMMARY OF THE INVENTION

The present invention addresses the aforementioned needs in the art, as will now be summarized and then further described in detail below.

Some variations of the invention provide a fracturing-fluid additive composition comprising a water-soluble portion of a biomass-pyrolysis liquid.

In some embodiments, the fracturing-fluid additive composition comprises one or more biomass-derived organic acids. In some embodiments, the fracturing-fluid additive composition comprises biomass-derived organic acids include acetic acid. In some embodiments, the fracturing-fluid additive composition comprises biomass-derived organic acids include formic acid. In some embodiments, the fracturing-fluid additive composition comprises one or more biomass-derived aldehydes or ketones. In some embodiments, the fracturing-fluid additive composition comprises one or more biomass-derived phenols. In some embodiments, the fracturing-fluid additive composition comprises one or more biomass-derived alcohols.

In some embodiments, the fracturing-fluid additive composition comprises contains at least 50 wt % water and is substantially biodegradable.

Some embodiments of the invention provide a fracturing-fluid additive composition comprising one or more biomass-derived compounds selected from the group consisting of organic acids, aldehydes, ketones, furans, phenols, esters, alcohols, and combinations thereof. In certain embodiments the fracturing fluid additive composition contains one or more biomass-derived compounds are derived from a water-soluble portion of a biomass-pyrolysis liquid. In certain embodiments the fracturing fluid additive composition contains one or more biomass-derived compounds are derived from a water-insoluble portion of a biomass-pyrolysis liquid.

Other variations of the present invention provide a fracturing fluid comprising water and an additive composition containing a water-soluble portion of a biomass-pyrolysis liquid.

In some variations of fracturing fluids, an additive composition comprises one or more biomass-derived compounds selected from the group consisting of organic acids, aldehydes, ketones, furans, phenols, esters, alcohols, and combinations thereof.

In some embodiments, the fracturing fluid further comprises a proppant. In other embodiments of fracturing fluids, a proppant comprises biochar.

In some variations of fracturing fluids, an additive composition is a breaker within said fracturing fluid. In other variations, an additive composition modifies the pH of said fracturing fluid.

In some embodiments of fracturing fluids, an additive composition is effective to stimulate flow of oil or gas within an oil or gas well by dissolving minerals, enlarging formation pores, initiating cracks, etching channels, and/or increasing permeability in rock. In other embodiments of fracturing fluids, an additive composition is effective to stimulate flow of oil or gas within an oil or gas well by cleaning the well borehole, casing, and/or formation, or by removing filter cake buildup.

Some variations of fracturing fluids include an additive composition with one or more compounds that inhibit metal oxide precipitation. In other variations of fracturing fluids, an additive composition includes one or more compounds that inhibit the corrosion potential of said fracturing fluid. In other variations of fracturing fluids, an additive composition includes one or more compounds that inhibit microbial growth within said fracturing fluid or at a contact surface disposed adjacent to said fracturing fluid.

Preferably, the fracturing fluid additive composition is renewable and biodegradable. Preferably, the fracturing fluid additive composition reduces the chemical or physical potential for groundwater contamination associated with said fracturing fluid.

Some variations of the invention provide a fracturing-fluid additive composition comprising the aqueous phase of a biomass-pyrolysis liquid, or a water-soluble portion of a biomass-pyrolysis liquid.

In some embodiments, the fracturing-fluid additive composition comprises one or more biomass-derived organic acids, such as acetic acid or formic acid. In some embodiments, the fracturing-fluid additive composition comprises one or more biomass-derived aldehydes or ketones. In some embodiments, the fracturing-fluid additive composition comprises one or more biomass-derived furans. In some embodiments, the fracturing-fluid additive composition comprises one or more biomass-derived phenols. In some embodiments, the fracturing-fluid additive composition comprises one or more biomass-derived esters. In some embodiments, the fracturing-fluid additive composition comprises one or more biomass-derived alcohols. In some embodiments, the fracturing-fluid additive composition comprises oxygenated decomposition products derived from cellulosic biomass. The decomposition products may include levoglucosan or organic acids, for example.

In some embodiments, the fracturing-fluid additive composition contains at least 15 wt % water, such as at least 30 wt %, 50 wt %, 70 wt %, or 90 wt % water. In certain embodiments, the fracturing-fluid additive composition contains at least 50 wt % water and at least 8 wt % acetic acid.

Some embodiments of the invention provide a fracturing-fluid additive composition produced by a process comprising pyrolyzing biomass into a pyrolysis oil and recovering an aqueous phase from the pyrolysis oil, wherein the fracturing-fluid additive composition comprises the aqueous phase. The pyrolysis oil may be obtained from biomass slow pyrolysis or biomass fast pyrolysis. In certain embodiments, the pyrolysis oil is obtained from one or more liquid fractions obtained from biomass fast pyrolysis followed by condensing pyrolysis vapors and electrostatically precipitating pyrolysis aerosols. In certain embodiments, the fracturing-fluid additive composition comprises condensed biomass-pyrolysis vapors, electrostatically precipitated biomass-pyrolysis aerosols, and water.

Preferably, the fracturing-fluid additive composition is substantially biodegradable. Preferably, the fracturing-fluid additive composition is not toxic, and/or reduces the toxicity of the fracturing fluid into which the additive is combined.

Other variations of the present invention provide fracturing fluids that include water, a proppant, an additive composition as described, and optionally other chemicals. In some embodiments, the proppant comprises biochar.

In some embodiments of fracturing fluids, an additive composition includes one or more acids that dissolve minerals, enlarge formation pores, initiate cracks, etch channels and increases permeability in rock to increase production or otherwise stimulate flow within an oil or gas well.

In some embodiments of fracturing fluids, an additive composition includes one or more acids that cleans the well borehole, casing and formation and removes filter cake buildup to increase production or otherwise stimulate flow within an oil or gas well.

In some embodiments of fracturing fluids, an additive composition includes one or more acids that reduce metal oxide precipitation from the fracturing fluid.

In some embodiments of fracturing fluids, an additive composition includes one or more compounds that inhibit the corrosion potential of the fracturing fluid.

In some embodiments of fracturing fluids, an additive composition includes one or more aldehydes that inhibit microbial growth within the fracturing fluid or at a surface of contact with the fracturing fluid.

In various embodiments of fracturing fluids, an additive composition modifies the properties of the fracturing fluid. Such properties may include, but are not limited to, pH, viscosity, density, lubricity, or stability. The additive composition may increase or decrease the viscosity of the fracturing fluid, or even be selected to maintain viscosity of the fracturing fluid as temperatures increase.

In some embodiments of fracturing fluids, an additive composition is a gelling agent, crosslinker, breaker, and/or clay stabilizer within the fracturing fluid.

In some embodiments of fracturing fluids, an additive composition prevents scale deposits from forming within a borehole, drill string, drill bit, casing and pipe. In some embodiments, an additive composition prevents corrosion within a borehole, drill string, drill bit, casing and pipe.

In preferred embodiments of fracturing fluids, an additive composition reduces water usage relative to the amount of water that would have been used in the absence of the additive(s). In preferred embodiments, an additive composition is renewable and biodegradable, and reduces groundwater contamination.

Some variations of the invention provide improved proppants for oil or gas well fracturing. In some embodiments, a proppant comprises biochar. In certain embodiments, some portion, or all of, the proppant consists essentially of biochar. The biochar, when packed into a formation fracture channel, may allow hydrocarbons to diffuse through pores of the biochar without plugging the fracture channel. The biochar may include ash particles, which can also serve as proppants. In some embodiments, at least a portion of the biochar additionally serves as a matrix for one or more other compounds contained in the fracturing fluid. In some embodiments, at least a portion of the biochar additionally serves as a fluid loss control additive contained in the fracturing fluid.

The present invention also relates to methods of using any of the disclosed fracturing-fluid additive compositions, fracturing fluids, or proppants. Any of these compositions or materials may be utilized to hydraulically fracture a natural gas well, a crude-oil well, or an oil-shale well, for example.

In some variations, the invention provides a method of sequestering carbon, the method comprising obtaining or producing biochar from biomass; utilizing the biochar as a fracturing proppant for an oil or gas well; and leaving at least a portion of the biochar within the oil or gas well to sequester carbon contained in the biochar.

Other variations of this invention relate to drilling fluids and drilling-fluid additive compositions. In some embodiments, a drilling-fluid additive composition comprises the water-soluble portion of a biomass-pyrolysis liquid. In these or other embodiments, a drilling-fluid additive composition comprises the water-insoluble portion of a biomass-pyrolysis liquid.

In some embodiments, a drilling-fluid additive composition comprises one or more biomass-derived organic acids, such as acetic acid or formic acid. In some embodiments, a drilling-fluid additive composition comprises one or more biomass-derived aldehydes, ketones furans, or phenols. In some embodiments, a drilling-fluid additive composition comprises lignin-decomposition products and/or oxygenated decomposition products (e.g., levoglucosan) derived from cellulosic biomass.

In particular embodiments, a drilling-fluid additive composition contains acetic acid, levoglucosan, furans, carbohydrates, syringols, guaiacols, and phenols. In some embodiments, the drilling-fluid additive composition comprises biochar.

A drilling-fluid additive composition may contain any amount of water, from no water to 90 wt % or more water. In some embodiments, the composition contains at least 15 wt %, 30 wt %, 50 wt %, 70 wt %, or 90 wt % water.

In some embodiments, a drilling-fluid additive composition is produced by a process comprising pyrolyzing biomass into a pyrolysis oil and recovering an aqueous phase from the pyrolysis oil, wherein the drilling-fluid additive composition comprises the aqueous phase. In some embodiments, a drilling-fluid additive composition is produced by a process comprising pyrolyzing biomass into a pyrolysis oil and recovering a water-insoluble phase from the pyrolysis oil, wherein the drilling-fluid additive composition comprises the water-insoluble phase. The pyrolysis oil may be obtained from biomass slow pyrolysis or fast pyrolysis, for example.

In some embodiments, a drilling-fluid additive composition is produced by a process comprising pyrolyzing biomass into a pyrolysis oil and recovering an aqueous phase and a water-insoluble phase from the pyrolysis oil, wherein the drilling-fluid additive composition comprises the aqueous phase and/or the water-insoluble phase. The drilling-fluid additive composition may include the aqueous phase, the water-insoluble phase, or both of these in any combination.

Preferably, a drilling-fluid additive composition is substantially biodegradable and non-toxic, and/or reduces the toxicity of the drilling fluid into which the additive is combined.

In some embodiments, a drilling-fluid additive composition improves stability of a wellbore, creates a largely impermeable layer in a wellbore, creates a flexible plug or sealant in a wellbore or casing, and/or creates a flexible plug or sealant in a casing for cementing.

Variation of this invention also relate to drilling fluids that include a bio-based additive composition as disclosed. The bio-based additive composition may modify the pH, viscosity, density, or lubricity of the drilling fluid. Additionally, the bio-based additive composition may modify the rheology of the drilling fluid. In some embodiments, the bio-based additive composition is shear-thinning and/or thixotropic.

In some embodiments, the bio-based additive composition acts as a gelling agent within the drilling fluid. In some embodiments, the bio-based additive composition acts as a surfactant within the drilling fluid. The additive composition may also act as an emulsion breaker within a drilling fluid, depending in the nature of the drilling fluid and other conditions present.

In various embodiments, a drilling fluid with an additive composition, as provided by the invention, further includes one or more compounds selected from the group consisting of cellulose, carboxymethylcellulose, starch, bentonite clay, barium sulfate, calcium carbonate, hematite, xanthan gum, guar gum, and glycol.

In some embodiments, a drilling fluid comprises biochar. The drilling fluid may further include ash. In some embodiments, a drilling fluid comprising a bio-based asphalt.

Some embodiments also provide drilling lost-circulation materials or drilling fluid scavenger materials, such as materials that contain biochar. In some embodiments, a lost-circulation material or drilling fluid scavenger material comprises a composition that is the same as one of the compositions described above with reference to drilling-fluid additive compositions.

Methods of using the drilling fluids or drilling-fluid additive compositions are also provided. In some embodiments, a method of drilling a wellbore comprises utilizing a drilling fluid as disclosed. The wellbore may be drilled for exploration or extraction of crude oil or natural gas, for example. In some embodiments, the drilling fluid, or a bio-based portion thereof, is introduced in varying amounts to dynamically respond to drilling performance.

Other variations of the invention relate to methods of using biochar. In some embodiments, a method includes introducing biochar directly or indirectly to an oil or gas reserve pit to stabilize or thicken solids contained in the reserve pit; to reduce the reclamation or remediation time associated with the reserve pit; to absorb suspended solids contained in the reserve pit; to remove contaminants and/or toxic materials in the reserve pit; and/or to sequester carbon contained in the biochar. In some embodiments, a method includes introducing cement containing porous biochar to an oil or gas well casing to reduce annular pressure buildup, and/or to sequester carbon. The biochar is produced from a biomass conversion process, such as (but not limited to) biomass slow or fast pyrolysis.

BRIEF DESCRIPTION OF THE DRAWINGS

The advantages of the technology described may be better understood by referring to the descriptions below with the accompanying drawings. The drawings are not to scale and represent exemplary configurations that depict general principles of the technology. Dotted lines within the figures are representative of optional process streams.

FIG. 3 provides an exemplary chemical composition of any one fast pyrolysis oil fraction or the aqueous phase of whole bio-oil whose properties enable it to be used as a drilling and/or fracturing fluid additive.

DETAILED DESCRIPTION OF EMBODIMENTS OF THE INVENTION

Figure 1:
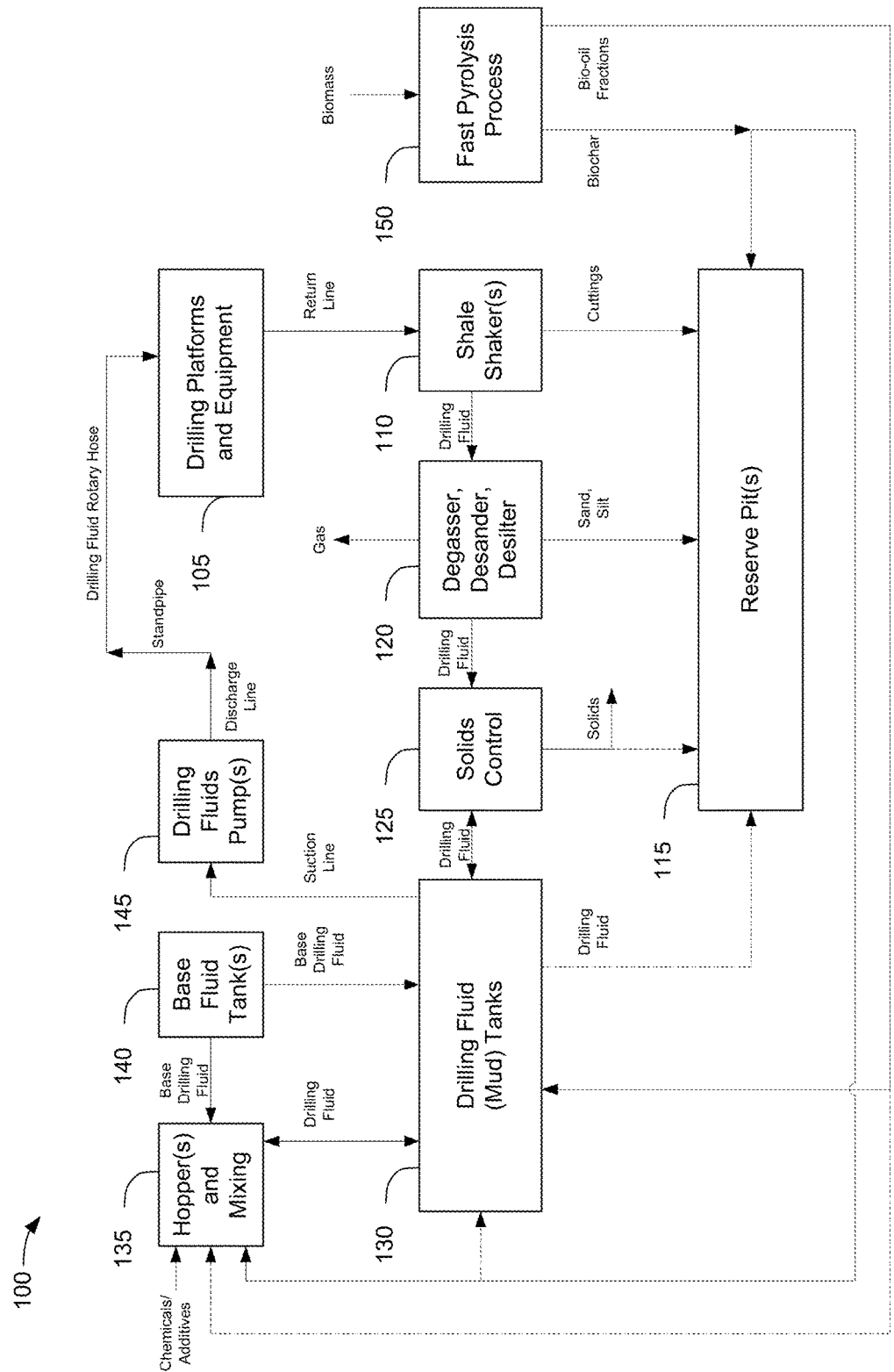
FIG. 1 provides an exemplary oil or gas drilling process coupled with a preferred fast pyrolysis process that converts biomass into renewable bio-oil fractions and carbon-rich biochar to reduce chemical and water use, modify drilling fluid properties and improve the environmental perception of drilling.

The compositions, apparatus, systems, and methods of the present invention will now be described in detail by reference to various non-limiting embodiments, including the figures which are exemplary only.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The present invention may be practiced by implementing method steps in different orders than as specifically set forth herein. All references to a "step" may include multiple steps (or substeps) within the meaning of a step. Likewise, all references to "steps" in plural form may also be construed as a single process step or various combinations of steps.

The present invention may be practiced by implementing process units in different orders than as specifically set forth herein. All references to a "unit" may include multiple units (or subunits) within the meaning of a unit. Likewise, all references to "units" in plural form may also be construed as a single process unit or various combinations of units.

As used in this specification and the appended claims, the singular forms "a," "an," and "the" include plural referents unless the context clearly indicates otherwise.

Some compositions are described in this patent application as "comprising" one or more particular species, while some compositions are described as "consisting essentially of" one or more particular species. The transitional phrases "comprising," "consisting essentially of" and "consisting of" define the scope of a claim with respect to what unrecited additional components or steps, if any, are excluded from the scope of the claim. The transitional term "comprising," which is synonymous with "including" or "containing" is inclusive or open-ended and does not exclude additional, unrecited elements or method steps. The transitional phrase "consisting essentially of" limits the scope of a claim to the specified materials or steps and those that do not materially affect the basic and novel characteristic(s) of the claimed invention.

The term "additive" should be broadly construed in this patent application to mean any amount of a particular species or mixture of species, from an amount that is just detectable according to known analytical techniques, up to and including an amount that constitutes essentially the entirety of a composition. Typically an additive will be added to a core composition, such as water, but the term additive (or "additive composition") does not preclude an additive being used as a composition per se for a suitable application.

"Drilling," for the purpose of the present invention, is any method to cut a borehole into the ground (whether onshore or offshore) at any suitable depth. "Drilling fluid", "drilling mud," or "completion fluid," for the purpose of the present invention, is any fluid or material used in a drilling process and put down into a borehole. "Cuttings," for the purpose of the present invention, are any crushed rock (often shale) pieces removed from the borehole with drilling fluid.

"Hydraulic fracturing fluid," "fracturing fluid," "fracking fluid," "fracking mud," "treatment fluid," "slickwater," or "pad" for the purpose of the present invention, is any fluid or material used in a hydraulic fracturing process, a well stimulation, completion, treatment or any other technique, and injected into borehole with the purpose of improving the process, permeability of the formation and increasing production. "Hydraulic fracturing," "fracking," "fracturing," or "hydrofracking" for the purpose of the present invention, is any method whereby fluids are injected into a borehole to create fissures in the formation and increase well production and increase permeability of a formation. "Well completion," "well stimulation," or "well treatment" for the purpose of the present invention, may include "hydraulic fracturing," "acidizing," "open hole," "conventional perforated," "sand exclusion," "permanent," "multiple zone," and/or "drainhole," completion techniques. A "reserve pit" as used herein is any structure or containment region for containing one or more materials used during production of oil or gas, such as during drilling or fracturing operations.

Any reference herein to geological structures such as "well," "formation," "wellbore," "borehole," and the like, should be broadly construed to include any possible geological structure or formation, anywhere in the world. Such geological structures may contain various combinations of natural gas (i.e., primarily methane), light hydrocarbon or non-hydrocarbon gases (including condensable and non-condensable gases), light hydrocarbon liquids, heavy hydrocarbon liquids, crude oil, rock, oil shale, bitumen, oil sands, tar, coal, and water.

Some embodiments are particularly useful for formations that contain primarily natural gas, but the present invention is by no means limited to such embodiments. Any reference to "oil and gas," "oil or gas," or "oil and/or gas" are meant to be used interchangeably to mean that a particular formation may include, or be drilled or fractured to produce, primarily gas, primarily oil, or any combination therebetween. In addition, the principles of the invention may be utilized for production (recovery) of primarily water from a geological structure.

"Biomass," for the purpose of the present invention, is any material not derived from fossil resources and comprising at least carbon, hydrogen, and oxygen. Biomass includes, for example, plant and plant-derived material, vegetation, agricultural waste, forestry waste, wood waste, and paper waste. "Bio-oil fractions" and "water-rich fraction," for the purpose of the present invention, are liquid products derived from biomass pyrolysis. In general the water-rich fraction may contain between 50-90 wt % water. "Biochar," for the purpose of the present invention, is a solid, carbon-rich, biomass derived product, such as that produced from fast pyrolysis.

Fast pyrolysis is a thermal process in which feedstock is rapidly heated in the absence of oxygen. The feedstock decomposes to generate pyrolysis vapors, aerosols, char and non-condensable gas. Fast pyrolysis processes typically produce 60-75 wt % of liquid bio-oil, 15-25 wt % of solid char, and 10-25 wt % of non-condensable gases, depending on the feedstock used.

Bio-oil is a dark brown, liquid-form of biomass. Also known as pyrolysis oil, biocrude oil, wood oil and pyroligneous acid, it contains a mixture of up to 400 organic compounds. Conventional bio-oil has high water and oxygen content, low energy content, high acidity and general instability. These poor properties prevent it from integrating into existing markets or blending with hydrocarbons without expensive upgrading. Bio-oil, however, can be separated into aqueous or water soluble and organic or water insoluble phases using separation techniques (Tushar P. Vispute, 2009; Lucia Garcia, 2000). The aqueous phase will contain more water than the organic phase. The "aqueous phase" is a water-rich pyrolysis liquid that will typically contain at least 50 wt % water while the "organic phase" will typically contain less than 10 wt % water. For the purpose of this invention, aqueous phase bio-oil may be functional in water-rich fraction applications and organic phase bio-oil may be functional in other bio-oil fraction applications.

Non-condensable gases include hydrogen, carbon monoxide, carbon dioxide, methane, and other light hydrocarbons. Non-condensable gases may also include inert gases used in the pyrolysis reactor. Typically, non-condensable gases represent about 10 wt % to about 25 wt % of pyrolysis products.

Biochar or char is a solid product of biomass pyrolysis. Fast pyrolysis seeks to maximize liquid bio-oil yield and minimize biochar yield. Biomass with high lignin and ash content tend to increase biochar yields while slow heating rates, long vapor residence times and high pressures lead to additional char formation.

A particular advantage of the present invention is using bio-oil fractions from a fast pyrolysis fractionation and biochar as renewable, biodegradable additives or replacements for water and chemicals use in drilling and hydraulic fracturing fluids. Bio-oil fractions may be collected using simple, low-cost, fractionation technology downstream of biomass fast pyrolysis. Bio-oil fractions have improved properties over conventional bio-oil since much of the water and acidic compounds are separated into a single fraction. Using bio-oil fractions and biochar is a new and preferred approach for improving the environmental outlook of drilling and hydraulic fracturing for two reasons. One, bio-oil fractions can be used to reduce and/or replace water and chemical usage of drilling and fracturing fluids, and two, bio-oil fractions minimize any environmental implications since they are renewable, biodegradable and have low toxicity.

In some variations, the present invention incorporates technology described in U.S. Pat. No. 8,100,990 entitled "Methods for Integrated Fast Pyrolysis Processing of Biomass" issued Jan. 24, 2012 to Ellens et al., which is incorporated by reference herein in its entirety.

Drilling

With reference to exemplary FIG. 1, the method and equipment in system 100 is used to drill a borehole to recover oil, natural gas, water or any other fluid and subterranean material.

The purpose of unit 105, drilling platform and equipment (includes the derrick) is to support, rotate and add pipe to the drilling string (pipe joints) as the drilling bit cuts out rock from the borehole. As the borehole is drilled, drilling fluid or drilling mud is pumped from unit 130 (drilling fluid tanks), through unit 145 (drilling fluid pumps) into unit 105 down through the drilling string, out of the drilling bit, into the hole and out the top of the borehole into unit 110, shale shakers.

Drilling fluids are composed of a base fluid that is usually water or oil (e.g. diesel, mineral oil, or synthetic oils), weighing agents such as barium sulfate (barite), clay, surfactants and other additives. Drilling fluid is used to cool and turn the bit, lubricate the drill string, suspend and transport cuttings, control hydrostatic pressure to prevent formation fluids from entering the borehole, support the well and formation walls to prevent collapse, stabilize exposed underground surfaces, and add buoyancy to reduce stress on heavy drilling tools.

Drilling fluid, drilled solids and cuttings leave unit 105 and enter unit 110, shale shakers to remove coarse cuttings. Unit 110, shale shakers, is one of the most important pieces of equipment on the entire rig. Modern rigs may have 4 or more shale shakers. The shakers are fitted with a series of vibrating screens to separate material based on size—liquid phase and fine solids pass through the screens while larger material does not.

After cuttings are separated from drilling fluid in unit 110 they are collected and transported to unit 115, reserve pits for dry land rigs. Offshore rigs do not have reserve pits and discard cuttings onto the bottom of the lake or ocean. In the case of dry land drilling, reserve ponds are also called earthen pits; these pits are used to dispose of drilling cuttings, solids, mud, fluids and chemicals. The pit size may range from 0.3-0.6 acres depending on the well depth. Solids settle to the bottom, while fluids on top are available for re-use in emergencies. Reserve pits are fitted with a synthetic liner. In some embodiments, reserve pits are left to evaporate and dry out, leaving the liner to encapsulate and bury remaining solids. In another embodiment, benign solids may be buried without the liner, or contaminated solids may need to be transported away from the pit for alternate disposal. Closed loop drilling systems and alternative drilling waste disposal systems that don't require reserve pits are available, but less common. Reserve pits are an environmental concern because of their potential for contamination and wildlife harm. If not carefully controlled and managed, reserve pits can contaminate soil, groundwater and surface water (Ramirez Jr., 2009). In a preferred embodiment, biochar from unit 150, fast pyrolysis process, is used in unit 115 as a reserve pit remediation and carbon sequestration agent.

Recycled drilling fluid from unit 110, shale shakers, is subjected to further separation and cleaning in a combination of equipment in unit 120, degasser, desander and desilter. The purpose of unit 120 is to remove cutting and drilling solid materials from the drilling fluid because they are abrasive and difficult to pump. The first step in unit 120 is a degasser that uses vacuum pressure or gravity to separate entrained gases (e.g. air, $H_2S$, methane, etc.) from the fluids. The gas may be flared. The second step in unit 120 is a desander and desilter used to remove sand and silt from the drilling fluids. These devices are functionally identical to a gas cyclone but are called hydrocyclones since they separate solids from liquids using centrifugal forces. Desanders are typically larger and remove larger size particles than desilters. Separated sand, silt and other drilling solids are collected and transported to unit 115, reserve pit.

Drilling fluid from unit 120 is transported to unit 125, solids control. Here, additional cleaning steps may be included after the desilter, usually to control the fine solids content of the drilling fluid. Unit 125 uses a screen separation step to recover, conserve or recycle weighting agents added to the drilling fluid. Common weighting agents are dense materials such as barite or barium sulfate. Recovered solids are recycled and reused or transported to the reserve pit, unit 115.

Drilling fluids from unit 125 are transported to unit 130, drilling fluid tanks or mud tanks. The purpose of unit 130 is to mix and prepare drilling fluid for service in one or more tanks or pits before being pumped into the borehole. In one embodiment, drilling fluid is recycled from the borehole and cleaned in units 110, 120 and 125 before entering unit 130 and then is recycled back to the borehole.

In another embodiment, before the borehole is drilled, drilling fluid is prepared in unit 130. Additives and chemicals from unit 135 are mixed with base drilling fluids from unit 140. Additives that may be used usually fall into the following categories: (1) weight materials, (2) viscosifiers, (3) scavengers, (4) shale stabilizers, (5) well protection, (6) defoamers, (7) lubricants, and (8) dispersants and deflocculants. Additives can be solid or liquid, and may have separate storage and/or receiving tanks or vessels in unit 135. In some embodiments unit 135 is capable of mixing dry and/or liquid additives and may be fully integrated with unit 130 and/or unit 140.

The purpose of unit 140 is to store base drilling fluids in storage tanks Drilling fluid is usually water-based (fresh or brine water), or oil-based (e.g., diesel, mineral oil, or synthetic oil). For dry land drilling, storage tanks may be mobile tanker trucks or stationary tanks. For ocean or fresh water drilling there is no need to store drilling fluids since the surrounding water is used. Base drilling fluids are transported to unit 135 for mixing with additives or to unit 130 for mixing and storage.

Clean and recycled drilling fluid from unit 130 is suctioned out of drilling fluid tanks into unit 145 where it is pumped by large reciprocating pumps into unit 105 down the borehole. Drilling fluid pumps in unit 145 are often called mud pumps. The high pressure pumps can inject drilling fluid over 50 MPa (7,500 psi) into the well. From the pumps, drilling fluid is discharged into a vertical, rigid standpipe before entering the rotary hose (or kelly hose). The rotary hose is a high pressure, flexible line that connects the standpipe to the remaining components for injection of drilling fluid into the well. The flexible rotary hose is important to allow for linear up and down motion of the drillstring during operation.

Unit 150, biomass fast pyrolysis process, may be integrated with the drilling rig to utilize excess heat and/or electrical power, or it may be independent. In a preferred embodiment, biochar from unit 150 is transported to unit 115, reserve pit for carbon storage, remediation, stabilizer, and/or unit 130, drilling fluid tank and mixing hopper as a weighting agent, viscosifier, or oxygen scavenger. In another preferred embodiment, bio-oil fractions from unit 150 are transported directly into unit 130, drilling fluid tank or into unit 135, mixing hopper as a weighting agent, viscosifier, scavenger, surfactant, stabilizer, lubricant, or other additive.

Bio-oil fractions can improve upon prior art when used in conjunction with drilling fluids since fractions may replace or reduce the use of chemical additives. In various embodiments, bio-oil fractions do not require powder/liquid mixing, thereby increasing operator safety, reducing cost, and/or reducing risk of exposure. In some embodiments, bio-oil fractions are biodegradable, water-based fluids that decrease concern over reserve pit location (e.g., proximity to wetlands or streams), pose much lower risk for contaminating ground water, may cost less than current additives, may reduce amount of water required, and may be used to adjust and meet drilling fluid specifications (e.g. pH, viscosity, density, etc.).

Once the borehole is completely drilled to a target depth, the well in unit 105 is cased with steel alloy pipe. The pipe prevents the well from collapsing. After each casing, drilling resumes to the next target depth unit completed. Typically four strings of casing are inserted into the well at different depths and diameters. From shortest and widest casing to longest and most narrow, the casing strings are called conductor, surface, intermediate and production casing (American Petroleum Institute, 2009).

After each casing interval the casing is cemented in place to secure the steel casing. Cement fills the annulus between the well wall and casing itself. Before the cement is pumped down the casing, a plug is inserted to prevent contamination and separate the cement from the drilling fluid that remains in the borehole. Cement is then pumped down into the casing until the specified volume is reached while drilling fluids are displaced up and around the casing in the annulus. A second plug is put down the casing following the cement. Drilling fluid is then pumped into the casing on top of the second plug. When the first plug reaches the bottom, pumping pressure is increased to rupture the plug so that the cement turns around casing and is displaced up the annulus until the top plug reaches the bottom. After the casing is cemented the borehole is left alone so that the cement cures. This process is repeated until the final production casing is in place. In one embodiment, biochar is mixed in with the cement used for casing. Porous biochar may reduce annular pressure buildup by collapsing and creating space for cement to expand into as it hardens. In one embodiment, biochar serves to protect the casing from deformation by reducing annular pressure buildup while simultaneously sequestering carbon.

After the production casing is cemented and cured the well is ready for well completion. This is the process that prepares the well for production. Different types of well completion exist including open hole, conventional perforated, sand exclusion, stimulation, acidizing, permanent, multiple zone and drainhole completion, inter alia. The completion type is selected depending on the targeted hydrocarbon formation. In some embodiments solids-free completion fluids are used during well completion to set screens, liners, packers, downhole valves or shooting perforations in the production zone. Completion fluids are designed so that the formation is not damaged. Often completion fluids are brines such as chlorides, bromides and formates. Drilling fluids are not often used for well completion due to their solids content, pH and other properties. In one embodiment one or more bio-oil fractions are used as additives, partial replacements and/or full replacements of well completion fluids.

FIG. 3 illustrates a table of exemplary chemical groups and corresponding weight percentage range found in bio-oil fractions and in the aqueous phase of whole bio-oil. Bio-oil fractions from unit 150 and/or the aqueous phase of whole bio-oil can be used as drilling fluid additives as demonstrated in FIG. 1. Bio-oil fractions contain between 0-90 wt % water. In one embodiment, bio-oil fractions containing between 56-90 wt % water are used as drilling fluid additives. Bio-oil fractions contain between 0-30 wt % levoglucosan. In a preferred embodiment bio-oil fractions containing between 0-5 wt % levoglucosan are used as drilling fluid additives. Bio-oil fractions also contain between 0-25 wt % carboxylic acids including acetic and formic acids. In a preferred embodiment, bio-oil fractions containing between 10-25 wt % carboxylic acids are used as drilling fluid additives. Bio-oil fractions also contain furans in the range of 0-18 wt %; phenolics in the range of 0-24 wt %; guaiacols in the range of 0-15 wt %; syringols in the range of 0-18 wt % and other light organics in the range of 0-50 wt %. In a preferred embodiment bio-oil fractions containing furans between 0-5 wt %; phenolics between 0-5 wt %; guaiacols between 0-3 wt %; syringols between 0-5 wt %; and other light organics in the range of 5-30 wt % are used as drilling fluid additives or replacements.

Hydraulic Fracturing

Hydraulic fracturing is a formation stimulation method used to create additional permeability in a producing formation to allow hydrocarbon fluids (oil and/or gas) or water to flow more easily toward the wellbore for purposes of production. Hydraulic fracturing can be used to overcome natural barriers to the flow of fluids to the wellbore. Barriers may include naturally, low, permeability common in shale formations or reduced permeability resulting from near-wellbore damage during drilling activities.

Figure 2:
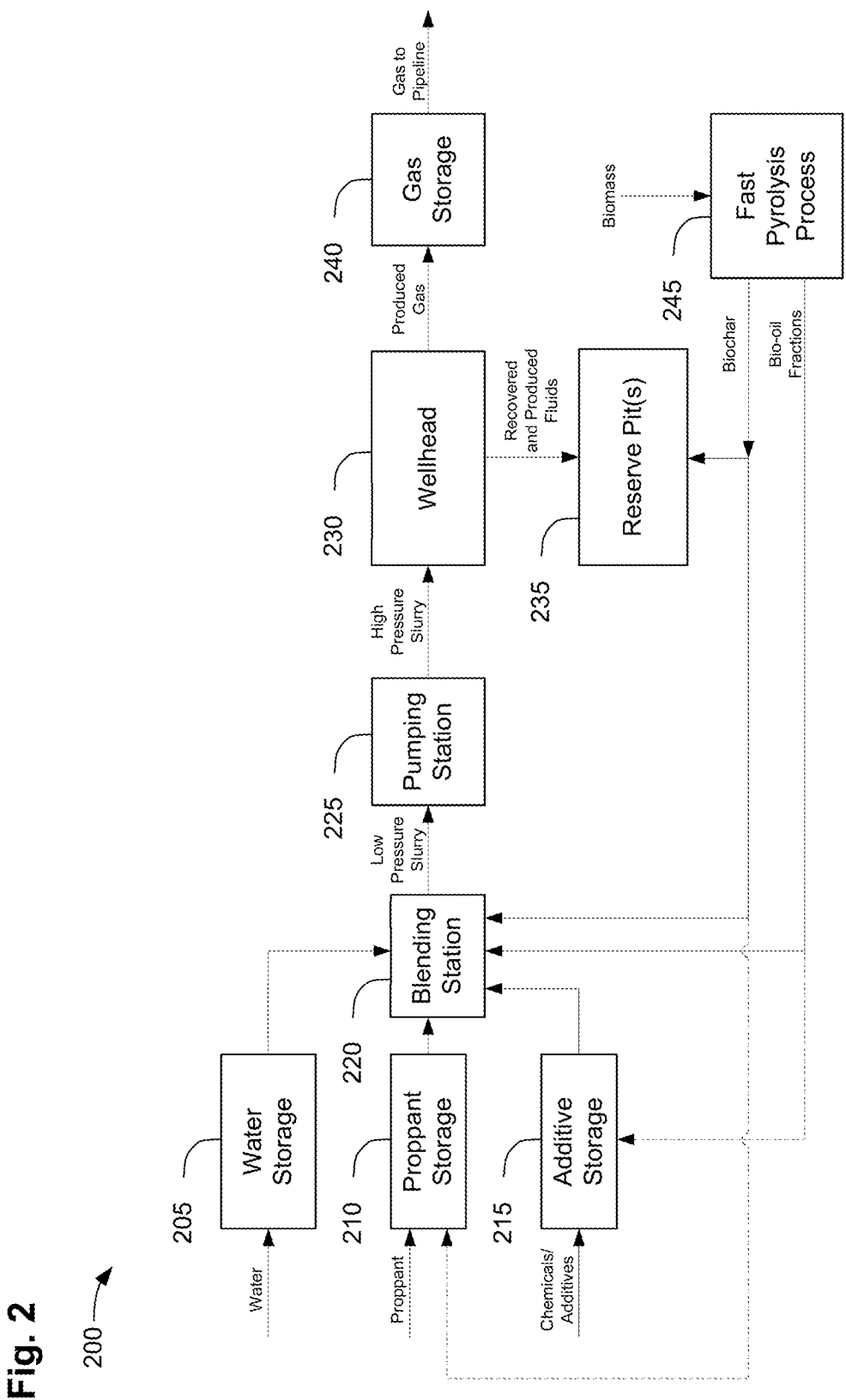
FIG. 2 provides an exemplary oil or gas hydraulic fracturing process coupled with a preferred fast pyrolysis process that converts biomass into renewable bio-oil fractions to reduce chemical and water use and modify hydraulic fracturing fluid properties and carbon-rich biochar to use as a proppant, sequester carbon and improve the environmental sustainability of hydraulic fracturing.

With reference to exemplary FIG. 2, the method and equipment in system 200 is used to hydraulically fracture a formation to create additional production of oil, natural gas, water or any other fluid and subterranean material. Hydraulic fracturing may be performed within any well or formation, whether onshore or offshore, at any depth.

Typically hydraulic fracturing is performed on new wells or wells with poor production. Hydraulic fracturing can be done in vertical wells but also in horizontally drilled wells. Hydraulic fracturing takes place after the casing is cemented in place and may be a part of the completion phase.

Hydraulic fracturing involves perforating the well in the production formation. In some embodiments, fracturing is accomplished by pumping in liquids at high pressure. A hydraulic fracture may be formed by pumping a fracturing fluid into the wellbore at a rate sufficient to increase the pressure downhole to a value in excess of a critical fracture pressure associated with the formation rock. The pressure causes the formation to crack, allowing the fracturing fluid to enter and extend the crack farther into the formation. To keep this fracture open after the injection stops, a solid proppant is added to the fracture fluid, as explained further below, and as shown in FIG. 2. The propped hydraulic fracture then becomes a high-permeability conduit through which the formation fluids can flow to the well.

In these or other embodiments, a series of explosive charges are lowered into a well. Charges are triggered at the top of the well causing an explosion that cuts through the casing, cement and fractures the surrounding formation. The perforation process is repeated along the length of the production formation. After the desired perforations have been created, a hydraulic fracturing fluid is mixed and injected into the well as indicated in FIG. 2.

Following fracturing by high pressures and/or explosions, the fractured formation allows more hydrocarbons (e.g., methane, condensate, ethane, oil) and/or water to be extracted since the formation walls are more porous.

The purpose of unit 205, water storage is to hold water used as a base for the fracturing fluid. Water is pumped into unit 220, blending station where other chemicals, additives and proppant are added. Water typically composes around 90% of the hydraulic fracturing fluid and may require millions of gallons per well. Water for the drilling fluid is typically brought on to site in tanker trucks which is costly.

The purpose of unit 210 is to store proppant for mixing into the fracturing fluid in unit 220. Conventionally, proppant is hard silica sand that usually makes up around 9% of the fracturing fluid mixture. Proppant is injected into the well to prop fine cracks, fractures and fissures open in the formation to create a path for hydrocarbons to escape. In one embodiment, biochar from unit 245 is mixed with conventional proppant (e.g., sand) and stored in unit 210.

Biochar particles can also prop, or assist in propping, fine cracks, fractures, and fissures in the formation. In some embodiments, the biochar includes a substantial concentration of ash, such as about 1 wt %, 5 wt %, 10 wt %, 20 wt % or more. The ash will vary in composition, depending on what feedstock was used to produce the biochar, but typically the ash will contain a significant fraction of silica. This silica will be able to serve as a proppant in a similar manner as the silica or sand particles in conventional proppant. Biochar, when packed into the formation fracture may still allow hydrocarbons to pass through due to its high porosity thereby improving upon prior art in which solid proppants may plug the fracture channel. Additionally, in some embodiments, introducing biochar into the well can effectively sequester carbon when some portion (or all) of the biochar is not recovered from the produced well.

The purpose of unit 215 is to store and meter chemicals and additives into unit 220 where they are mixed with water from unit 205 and proppant from unit 210. Many chemicals are used for hydraulic fracturing to improve the process. Chemicals typically make up about 1% of the hydraulic fracturing fluid. Common chemicals, their purpose and function in the fracturing fluid are included in Table 1 (Ground Water Protection Council and Interstate Oil and Gas Compact Commission, 2011). In one embodiment bio-oil fractions are stored in unit 215.

Most chemicals in Table 1 are generally used to dissolve minerals, reduce friction, prevent scaling, maintain fluid properties (viscosity, pH, etc.), eliminate bacteria, suspend the sand, prevent precipitation of metal oxides, prevent corrosion, stabilize fluid, formation and borehole, thicken fluid (gelling agent) and breakdown the gel (breaker).

TABLE 1

Common Hydraulic Fracturing Fluid Chemicals

| Chemical Name | Chemical Purpose | Product Function |
|---|---|---|
| Hydrochloric Acid | Dissolve minerals and initiates cracks in the rock | Acid |
| Glutaraldehyde | Eliminate bacteria | Biocide |
| Ammonium Chloride | Eliminate bacteria | Biocide |
| Ammonium Persulfate | Allows a delayed break down of the gel | Breaker |
| Sodium Chloride | Product Stabilizer | Breaker |
| Magnesium Peroxide | Allows a delayed break down the gel | Breaker |
| Tetramethyl ammonium chloride | Prevents clays from swelling or shifting | Clay Stabilizer |
| Sodium Chloride | Prevents clays from swelling or shifting | Clay Stabilizer |
| Formic Acid | Prevents the corrosion of the pipe | Corrosion Inhibitor |
| Acetaldehyde | Prevents the corrosion of the pipe | Corrosion Inhibitor |
| Petroleum Distillate | Carrier fluid for borate or zirconate crosslinker | Crosslinker |
| Light Petroleum Distillate | Carrier fluid for borate or zirconate crosslinker | Crosslinker |
| Potassium Metaborate | Maintains fluid viscosity as temperature increases | Crosslinker |
| Triethanolamine Zirconate | Maintains fluid viscosity as temperature increases | Crosslinker |
| Boric Acid | Maintains fluid viscosity as temperature increases | Crosslinker |
| Borate Salts | Maintains fluid viscosity as temperature increases | Crosslinker |

TABLE 1-continued

Common Hydraulic Fracturing Fluid Chemicals

| Chemical Name | Chemical Purpose | Product Function |
|---|---|---|
| Ethylene Glycol | Product stabilizer and/or winterizing agent | Crosslinker |
| Methanol | Product stabilizer and/or winterizing agent | Crosslinker |
| Polyacrylamide | "Slicks" the water to minimize friction | Friction Reducer |
| Petroleum Distillate | Carrier fluid for polyacrylamide friction reducer | Friction Reducer |
| Light Petroleum Distillate | Carrier fluid for polyacrylamide friction reducer | Friction Reducer |
| Methanol | Product stabilizer and/or winterizing agent | Friction Reducer |
| Ethylene Glycol | Product stabilizer and/or winterizing agent | Friction Reducer |
| Guar Gum | Thickens the water in order to suspend the sand | Gelling Agent |
| Petroleum Distillate | Carrier fluid for guar gum in liquid gels | Gelling Agent |
| Light Petroleum Distillate | Carrier fluid for guar gum in liquid gels | Gelling Agent |
| Methanol | Product stabilizer and/or winterizing agent | Gelling Agent |
| Polysaccharide Blend | Thickens the water in order to suspend the sand | Gelling Agent |
| Ethylene Glycol | Product stabilizer and/or winterizing agent | Gelling Agent |
| Citric Acid | Prevents precipitation of metal oxides | Iron Control |
| Acetic Acid | Prevents precipitation of metal oxides | Iron Control |
| Thioglycolic Acid | Prevents precipitation of metal oxides | Iron Control |
| Lauryl Sulfate | Used to prevent the formation of emulsions | Non-Emulsifier |
| Isopropanol | Product stabilizer and/or winterizing agent | Non-Emulsifier |
| Ethylene Glycol | Product stabilizer and/or winterizing agent | Non-Emulsifier |
| Sodium Hydroxide | Adjusts the pH of fluid | pH Adjusting Agent |
| Potassium Hydroxide | Adjusts the pH of fluid | pH Adjusting Agent |
| Acetic Acid | Adjusts the pH of fluid | pH Adjusting Agent |
| Sodium Polycarboxylate | Prevents scale deposits in the pipe | Scale Inhibitor |
| Phosphonic Acid Salt | Prevents scale deposits in the pipe | Scale Inhibitor |
| Lauryl Sulfate | Used to increase the viscosity of the fracture fluid | Surfactant |
| Ethanol | Product stabilizer and/or winterizing agent | Surfactant |
| Naphthalene | Carrier fluid for the active surfactant ingredients | Surfactant |
| Methanol | Product stabilizer and/or winterizing agent | Surfactant |
| Isopropyl Alcohol | Product stabilizer and/or winterizing agent | Surfactant |
| 2-Butoxyethanol | Product stabilizer | Surfactant |

Chemical additives and amounts are selected according to the geographic location of the well, type of formation, and target production fluid. Once the appropriate chemicals in unit 215 have been selected they are mixed with proppant and water in unit 220, blending station. In one embodiment bio-oil liquids are added to unit 220 from unit 245, fast pyrolysis process. In a preferred embodiment a particular bio-oil liquid composed largely of acids and water is added to unit 220 from unit 245, fast pyrolysis process.

In preferred embodiments, fracturing-fluid additive compositions comprise a water-soluble portion of a biomass-pyrolysis liquid. In these or other embodiments, fracturing-fluid additive compositions comprise a water-insoluble portion of a biomass-pyrolysis liquid. It will also be recognized that even when it is desired to include primarily a water-soluble portion of a biomass-pyrolysis liquid, some amount of normally water-insoluble materials may be included in the fracturing-fluid additive composition, such as by non-equilibrium entrainment or other factors associated with particular preparation techniques.

Bio-oil fractions can improve upon prior art when used in conjunction with fracturing fluids. Bio-oil fractions can have the following benefits:
 organic acids may be used to prevent precipitation of metal oxides (iron control)
 acids used to dissolve minerals and initiate cracks in rock
 acids also used to adjust pH of fluid to maintain effectiveness of other components
 fractions can reduce water usage
 fractions can be used as a breaker for the gel
 fractions can be used to prevent corrosion and biological activity
 fractions can adjust fracturing fluid properties (e.g., viscosity, lubricity, stability, density)
 fractions can maintain fracturing fluid properties under changing temperature and pressure
 using bio-derived material to accomplish the same purpose as fossil based chemicals
 reduced environmental threat and public scrutiny
 renewable and biodegradable materials minimize environmental impact In another preferred embodiment biochar from unit 245 is blended into unit 220. Biochar is a solid, carbon-rich material that may be used as a proppant and simultaneously sequester carbon when pumped below ground.

Hydraulic fracturing fluid from unit 220, blending station is pumped as a low pressure slurry to unit 225, pumping station. The purpose of unit 225 is to inject the fracturing fluid into the borehole in unit 230, wellhead. High volume pumps are used to quickly inject fracturing fluid at high pressure into the formation. The pumps are capable of creating pressures up to 100 MPa (15,000 psi) and flowrates over 265 L/s (100 barrels/minute).

The high-pressure hydraulic fracturing fluid slurry enters unit 230, wellhead, from unit 225. As the fracturing fluid is injected into the well it penetrates the casing perforations into the production formation. The high pressure creates new fractures in the rock while widening and elongating existing ones. The fracturing fluid also serves to dissolve minerals, enlarge formation pores, initiate cracks, etch channels and increases permeability in rock to increase production or otherwise stimulate flow within an oil or gas well.

Proppant suspended in the fracturing fluid by gelling agents such as gaur gum and polysaccharides is carried deep into the formation and props the cracks open. Without the proppant, fractures would seal up after releasing the pressure.

Biochar may also serve as a fluid loss control additive by blocking formation cracks to prevent hydraulic fracturing fluid from seeping out of the wellbore before the formation.

Recovered and produced fluids and fine solids are swept out of the well by the fracturing fluid and transported to unit 235, reserve pits. Reserve pits are lined with a synthetic liner to prevent leaking and ground water contamination. Reserve pits store recovered hydraulic fracturing fluids, other produced fluids, loose proppant and chemical additives. In some embodiments fluids and chemicals are recycled and reused at new hydraulic fracturing sites. In another embodiment, the fluids evaporate and the solids are wrapped in the liner and buried.

In preferred embodiments, biochar from unit 245 is transported to the reserve pits to sequester carbon. Introduction of biochar directly or indirectly into a reserve pit can have several other advantages. For example, biochar may stabilize or thicken solids contained in the reserve pit, reduce the reclamation or remediation time associated with the reserve pit, capture toxic chemicals, and absorb suspended solids.

After the hydraulic fracturing fluid and produced fluids have been recovered in unit 235 a production well head is placed on top of the well in unit 230. At this time, hydrocarbons (typically oil or natural gas) are extracted and stored in unit 240 before shipment through pipeline, tanker truck, railroad, tanker ship, or another means of transport.

FIG. 3 illustrates a table of exemplary chemical groups and corresponding weight percentage range found in bio-oil fractions and the aqueous phase of whole bio-oil. Bio-oil fractions from unit 245 and/or the aqueous phase of whole bio-oil can be used as hydraulic fracturing fluid additives, in some embodiments, as demonstrated in FIG. 2. Bio-oil fractions contain between 0-90 wt % water. In one embodiment, bio-oil fractions containing between 56-90 wt % water are used as hydraulic fracturing fluid additives. Bio-oil fractions contain between 0-30 wt % levoglucosan. In a preferred embodiment bio-oil fractions containing between 0-5 wt % levoglucosan are used as hydraulic fracturing fluid additives. Bio-oil fractions also contain between 0-25 wt % carboxylic acids including acetic and formic acids. In a preferred embodiment, bio-oil fractions containing between 10-25 wt % carboxylic acids are used as hydraulic fracturing fluid additives. Bio-oil fractions also contain furans in the range of 0-18 wt %; phenolics in the range of 0-24 wt %; guaiacols in the range of 0-15 wt %; syringols in the range of 0-18 wt % and other light organics in the range of 0-50 wt %. In a preferred embodiment bio-oil fractions containing furans between 0-5 wt %; phenolics between 0-5 wt %; guaiacols between 0-3 wt %; syringols between 0-5 wt %; and other light organics in the range of 5-30 wt % are used as hydraulic fracturing fluid additives or replacements.

In a preferred approach unit 245, fast pyrolysis process supplies bio-oil fractions and biochar for a hydraulic fracturing process. As mentioned, bio-oil fractions and biochar may be added to the fracturing fluid to reduce environmental scrutiny by using renewable and biodegradable products in place of toxic chemicals and to reduce water use while maintaining fluid design specifications and quality.

Fast Pyrolysis and Bio-Oil Fractionation Process

In a preferred approach, units 150 and 245 are described in U.S. Pat. No. 8,100,990 entitled "Methods for Integrated Fast Pyrolysis Processing of Biomass" issued Jan. 24, 2012 to Ellens et al., which is incorporated by reference herein in its entirety.

Units 150 and 245 provide a method for pretreating and converting biomass into liquid bio-oil fractions, solid biochar, and non-condensable gas. These products are collected, processed, produced and recycled or stored on site. The operation of units 150 and 245 are integral to the production of value-added products including renewable bio-oil fractions and biochar which can improve the environmental sustainability of drilling and hydraulic fracturing.

In another approach, units 150 and 245 are biomass fast pyrolysis processing facilities producing whole bio-oil, biochar and non-condensable gas. In this embodiment, whole bio-oil is separated into its organic and aqueous phases to provide bio-oil fractions and a water-rich fraction, respectively.

In another approach, units 150 and 245 are any biomass processing facility that may produce a biomass-derived liquid that is effective in oil and gas drilling and/or fracturing processes. Preferably, units 150 and 245 are a biomass pyrolysis facility producing one or more biomass-derived liquid fractions.

In one approach, the fast pyrolysis process, units 150 and 245, are co-located with a well site so as to provide mutual benefit to one another and add another level of integration. Co-location of a fast pyrolysis processing plant with an well site may provide access to utilities and auxiliary infrastructure. In another approach, unit 150 and 245 are independently owned and operated facilities that produce and sell bio-oil fractions and biochar products to drilling, hydraulic fracturing and fluid manufacturing and supply companies. The integrated fast pyrolysis process in units 150 and 245 are able to use many different feedstocks including lignocellulosic biomass and other carbon-based energy sources. In certain approaches, the fast pyrolysis process uses locally sourced biomass to produce bio-oil fractions as additives and/or replacements for drilling and hydraulic fracturing fluids as well as biochar for proppants, cementing additives and reserve pit remediation.

Bio-oil fractions, biochar, and the water-rich fraction when used in the manner described can effectively minimize environmental impact, scrutiny, water-use and costs of drilling, treating and hydraulic fracturing for oil and gas. Furthermore, these products are environmentally benign, have reduced toxicity and do not contaminate drinking water. Fast pyrolysis can convert biomass into renewable bio-oil fractions and carbon-rich biochar to reduce water use, hazardous chemicals and fluid cost while improving the environmental sustainability of drilling, treating and hydraulic fracturing for oil and gas.

EXAMPLES

The Examples set forth below are for illustrative purposes only and are not intended to limit, in any way, the scope of the present invention.

Example 1

Aqueous Phase of Bio-Oil Tested as a Breaker at 90° C.

Fracturing fluid samples treated with an aqueous phase pyrolysis liquid (water-rich fraction) breaker were prepared in a blender and analyzed to determine break time. A gelling agent containing a solution of 54 wt % guar gum powder and 46 wt % vegetable oil was hydrated in 0.5 liters of de-ionized water for 2 minutes. Each sample was treated with a quantity of aqueous phase pyrolysis liquid breaker diluted with de-ionized water (100:1) and 14 wt % sodium tetraborate/methanol solution to crosslink the gel. The aqueous phase pyrolysis liquid was produced from oak biomass using a pilot scale fast pyrolysis system described in U.S. Pat. No. 8,100,990. Sand, sieved between 20 and 30 mesh, was added to each sample after crosslinking to visually determine the time required to break the gel. A Brookfield DV-E rotational viscometer was used to confirm a visually broken gel by ensuring a viscosity below 50 cP at 90° C.

The aqueous phase pyrolysis liquid concentration is shown as gallons of 100:1 diluted pyrolysis liquid per 1000 gallons of de-ionized water. Samples were sealed in high density polyethylene Nalgene bottles and placed in a hot oil bath at 90° C. test temperature. Break time is shown in Table 2 as visually determined. The results indicate that break time is a function of aqueous phase pyrolysis liquid concentration which provides a high degree of control.

TABLE 2

Break time of guar gum gels at 90° C. as a function of aqueous phase pyrolysis liquid concentration

| Sample # | 100:1 Diluted Water-rich Fraction | Guar Gum solution (gal/1000 gal) | Crosslinker | Sample Temperature (° C.) | Break time (min) |
|---|---|---|---|---|---|
| 1 | 0.5 | 40.3 | 3.6 | 90 | 157 |
| 2 | 0.5 | 39.6 | 3.6 | 90 | 157 |
| 3 | 0.5 | 39.7 | 3.6 | 90 | 152 |
| 4 | 1 | 40.4 | 3.7 | 90 | 120 |
| 5 | 1 | 40.0 | 3.6 | 90 | 123 |
| 6 | 1 | 40.2 | 3.6 | 90 | 123 |
| 7 | 2 | 39.9 | 3.7 | 90 | 90 |
| 8 | 2 | 40.2 | 3.7 | 90 | 90 |
| 9 | 2 | 40.2 | 3.6 | 90 | 91 |
| 10 | 3 | 40.1 | 4.3 | 90 | 81 |
| 11 | 3 | 40.4 | 3.7 | 90 | 88 |
| 12 | 3 | 40.4 | 3.7 | 90 | 92 |
| 13 | 3 | 40.4 | 3.8 | 90 | 76 |
| 14 | 4 | 40.2 | 4.0 | 90 | 60 |
| 15 | 4 | 40.3 | 3.8 | 90 | 60 |
| 16 | 4 | 40.2 | 3.8 | 90 | 54 |

Example 2

Aqueous Phase of Bio-Oil Tested as a Breaker at 80° C.

Fracturing fluid samples treated with an aqueous phase pyrolysis liquid (water-rich fraction) breaker were prepared in a blender and analyzed to determine break time. A gelling agent containing a solution of 53 wt % guar gum powder and 47 wt % vegetable oil was hydrated in 0.5 liters of de-ionized water for 2 minutes. Each sample was treated with a quantity of aqueous phase pyrolysis liquid breaker diluted with de-ionized water (100:1) and 13 wt % sodium tetraborate/methanol solution to crosslink the gel. The aqueous phase pyrolysis liquid was produced from oak biomass using a pilot scale fast pyrolysis system described in U.S. Pat. No. 8,100,990. Sand, sieved between 20 and 30 mesh, was added to each sample after crosslinking to visually determine the time required to break the gel. A Brookfield DV-E rotational viscometer was used to confirm a visually broken gel by ensuring a viscosity below 50 cP at 80° C.

The aqueous phase pyrolysis liquid concentration is shown as gallons of 100:1 diluted pyrolysis liquid per 1000 gallons of de-ionized water. Samples were sealed in high density polyethylene Nalgene bottles and placed in a hot oil bath at 80° C. test temperature. Break time is shown in Table 3 as visually determined. The results indicate that break time is a function of aqueous phase pyrolysis liquid concentration which provides a high degree of control.

TABLE 3

Break time of guar gum gels at 80° C. as a function of aqueous phase pyrolysis liquid concentration

| Sample # | 100:1 Diluted Water-rich Fraction | Guar Gum solution (gal/1000 gal) | Crosslinker | Sample Temperature (° C.) | Break time (min) |
|---|---|---|---|---|---|
| 1 | 3 | 40.4 | 3.6 | 80 | 138 |
| 2 | 3 | 40.4 | 3.6 | 80 | 139 |
| 3 | 4 | 40.3 | 3.5 | 80 | 130 |
| 4 | 4 | 39.9 | 3.5 | 80 | 109 |
| 5 | 4 | 40.5 | 3.6 | 80 | 125 |
| 6 | 6 | 40.4 | 3.5 | 80 | 97 |
| 7 | 6 | 41.2 | 3.5 | 80 | 98 |
| 8 | 6 | 41.2 | 3.6 | 80 | 100 |
| 9 | 7 | 41.0 | 3.5 | 80 | 88 |
| 10 | 7 | 40.3 | 3.5 | 80 | 90 |
| 11 | 7 | 40.7 | 3.5 | 80 | 88 |
| 12 | 8 | 40.7 | 3.5 | 80 | 78 |
| 13 | 8 | 40.7 | 3.6 | 80 | 74 |
| 14 | 8 | 40.8 | 3.5 | 80 | 76 |

Example 3

Model Compounds Tested as a Breaker at 80° C.

Fracturing fluid samples treated with model compounds found in aqueous phase pyrolysis liquid were prepared in a blender and analyzed to determine break time. Acetic acid and methanol were found in a particular aqueous phase pyrolysis liquid at about 12 wt % and 1.6 wt %, respectively. Therefore, acetic acid and methanol were tested as model compound breakers once diluted with de-ionized water to concentrations similar to that found in diluted aqueous phase pyrolysis liquid. A gelling agent containing a solution of 53 wt % guar gum powder and 47 wt % vegetable oil was hydrated in 0.5 liters of de-ionized water for 2 minutes. Each was treated with a quantity and compound type analogous to diluted pyrolysis liquid, as shown in Table 4 and 13 wt % sodium tetraborate/methanol solution to cross link the gel. Sand, sieved between 20 and 30 mesh, was added to each sample after crosslinking to visually determine the time required to break the gel. A Brookfield DV-E rotational viscometer was used to confirm a visually broken gel by ensuring a viscosity below 50 cP at 80° C.

The concentration of the model compounds is shown as gallons of 100:1 diluted acetic acid or methanol per 1000 gallons of de-ionized water. Samples were sealed in high density polyethylene Nalgene bottles and placed in a hot oil bath at 80° C. test temperature. Break time is shown in Table 4 as visually determined. The experiment indicates that model compounds were not effective compared to aqueous phase pyrolysis oil. The results in Table 4 demonstrate that acetic acid and methanol model compounds in and of themselves cannot be used as breakers in hydraulic fracturing fluid since there was no evidence that the gel was broken or that the compound concentration actually affects the break time.

TABLE 4

Analysis of model compounds tested as breaker at 80° C.

| Sample # | 100:1 Diluted Acetic Acid Solution | 100:1 Diluted Methanol Solution | Guar Gum solution | Cross-linker | Sample Temperature (° C.) | Observation time* (min) |
|---|---|---|---|---|---|---|
| | | (gal/1000 gal) | | | | |
| 1 | 4 | — | 40.1 | 3.6 | 80 | 258 |
| 2 | 6 | — | 40.4 | 3.4 | 80 | 256 |
| 3 | — | 4 | 40.3 | 3.6 | 80 | 548 |
| 4 | — | 6 | 40.7 | 3.6 | 80 | 548 |

*Samples did not fully break but demonstrated a decrease in viscosity which may have been due to the gel naturally breaking down.

Example 4

Aqueous Phase of Bio-Oil Tested as a Breaker at 80° C. Using a Saline Solution

Fracturing fluid samples treated with an aqueous phase pyrolysis liquid (water-rich fraction) breaker were prepared in a blender and analyzed to determine break time. A gelling agent containing a solution of 53 wt % guar gum powder and 47 wt % vegetable oil was hydrated in 0.5 liters of 1 molar saline solution for 2 minutes. Each sample was treated with a quantity of aqueous phase pyrolysis liquid breaker diluted with de-ionized water (100:1) and 13 wt % sodium tetraborate/methanol solution to crosslink the gel. The aqueous phase pyrolysis liquid was produced from oak biomass using a pilot scale fast pyrolysis system described in U.S. Pat. No. 8,100,990. Sand, sieved between 20 and 30 mesh, was added to each sample after crosslinking to visually determine the time required to break the gel. A Brookfield DV-E rotational viscometer was used to confirm a visually broken gel by ensuring a viscosity below 50 cP at 80° C.

The aqueous phase pyrolysis liquid concentration is shown as gallons of 100:1 diluted pyrolysis liquid per 1000 gallons of 1 molar saline solution. Samples were sealed in high density polyethylene Nalgene bottles and placed in a hot oil bath at 80° C. test temperature. Break time is shown in Table 5 as visually determined. The results indicate that break time is a function of aqueous phase pyrolysis liquid concentration which provides a high degree of control.

TABLE 5

Break time of guar gum gels in saline solution at 80° C. as a function of aqueous phase pyrolysis liquid concentration

| Sample # | 100:1 Diluted Water-rich Fraction | Guar Gum solution | Crosslinker | Sample Temperature (° C.) | Break time (min) |
|---|---|---|---|---|---|
| | | (gal/1000 gal) | | | |
| 1 | 4 | 40.8 | 3.6 | 80 | 130 |
| 2 | 6 | 40.8 | 3.6 | 80 | 98 |

Example 5

Aqueous Phase of Bio-Oil Tested as a Breaker at 80° C. Using Buffered Solutions

Fracturing fluid samples treated with an aqueous phase pyrolysis liquid (water-rich fraction) breaker were prepared in a blender and analyzed to determine break time. A gelling agent containing a solution of 53 wt % guar gum powder and 47 wt % vegetable oil was hydrated in 0.5 liters of de-ionized water for 2 minutes. Each sample was treated with a quantity of aqueous phase pyrolysis liquid breaker diluted with de-ionized water (100:1), pH 9.0 buffer solution and 13 wt % sodium tetraborate/methanol solution to crosslink the gel. The aqueous phase pyrolysis liquid was produced from oak biomass using a pilot scale fast pyrolysis system described in U.S. Pat. No. 8,100,990. Sand, sieved between 20 and 30 mesh, was added to each sample after crosslinking to visually determine the time required to break the gel. A Brookfield DV-E rotational viscometer was used to confirm a visually broken gel by ensuring a viscosity below 50 cP at 80° C.

The aqueous phase pyrolysis liquid concentration is shown as gallons of 100:1 diluted pyrolysis liquid per 1000 gallons of de-ionized water. Samples were sealed in high density polyethylene Nalgene bottles and placed in a hot oil bath at 80° C. test temperature. Break time is shown in Table 3 as visually determined. The results indicate that break time is a function of aqueous phase pyrolysis liquid concentration which provides a high degree of control.

TABLE 6

Break time of guar gum gels at 80° C. as a function of aqueous phase pyrolysis liquid and pH 9.0 buffer concentration

| Sample # | 100:1 Diluted Water-rich Fraction | pH 9.0 Buffer Solution | Guar Gum solution | Crosslinker | Sample Temperature (° C.) | Break time (min) |
|---|---|---|---|---|---|---|
| | | (gal/1000 gal) | | | | |
| 1 | 4 | 10 | 40.7 | 3.4 | 80 | 133 |
| 2 | 6 | 10 | 41.0 | 3.4 | 80 | 115 |
| 3 | 4 | 20 | 40.1 | 3.6 | 80 | 138 |
| 4 | 6 | 20 | 40.8 | 3.6 | 80 | 110 |

In this description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the principles of the invention. Additionally, certain steps may be performed concurrently in a parallel process when possible, as well as performed sequentially.

All publications, Internet sites, patents, and patent applications cited in this specification are herein incorporated by reference in their entirety as if each publication, patent, or patent application were specifically and individually put forth herein. Any Internet site contents and publications available on the Internet are incorporated herein as of the filing date of this patent application, even if such Internet sites or publications later become unavailable.

The embodiments, variations, and figures described above provide an indication of the utility and versatility of the present invention. Other embodiments that do not provide all of the features and advantages set forth herein may also be utilized, without departing from the spirit and scope of the present invention. Such modifications and variations are considered to be within the scope of the principles of the invention defined by the claims.

REFERENCES

American Petroleum Institute. (2009). *Hydraulic Fracturing Operations—Well Construction and Integrity Guidelines.* Washington: API Publishing Services.
American Petroleum Institute. (2010). *Hydraulic Fracturing: Unlocking America's Natural Gas Resources.* Washington D.C.: American Petroleum Institute.
American Petroleum Institute. (2010). *Water Management Associate with Hydraulic Fracturing.* Washington D.C.: API Publishing Services.
Ben Bloys, N. D. (1994). Designing and Managing Drilling Fluid. *Schlumberger Oilfield Review,* 6.
Drake Well Museum. (n.d.). Retrieved from http://www.drakewell.org/about.html Environmental Protection Agency. (2009). *Site Inspection—Analytical Results Report: Pavillion Area Groundwater Investigation Site.* Pavillion, Wyo.
Ground Water Protection Council and ALL Consulting. (2009). *Modern Shale Gas Development in the United States: A Primer.* U.S. Dept. of Energy, Office of Fossil Energy, and National Energy Technology Laboratory.
Ground Water Protection Council and Interstate Oil and Gas Compact Commission. (2011). *FracFocus Chemical Disclosure Registry.* Retrieved from http://fracfocus.org
IHS Global Insight. (2009). *Measuring the Economic and Energy Impacts of Proposals to Regulate Hydraulic Fracturing.* American Petroleum Institute.
Lucia Garcia, R. F. (2000). Catalytic steam reforming of bio-oils for the production of hydrogen: effects of catalyst composition. *Applied Catalysis A: General,* 201, 225-239.
Ramirez Jr., P. (2009). *Reserve Pit Management—Risks to Migratory Birds.* U.S. Fish and Wildlife Service, Environmental Contaminants Program.
Stephan G. Osborn, A. V. (2011). Methane contamination of drinking water accompanying gas-well drilling and hydraulic fracturing. Proceedings of the National Academy of Sciences of the United States of America (PNAS).
Tushar P. Vispute, G. W. (2009). Production of hydrogen, alkanes and polyols by aqueous phase processing of wood-derived pyrolysis oils. *Green Chemistry,* 11 (94), 1433-1445.
U.S. Department of Energy and Energy Information Administration. (2011). *World Shale Gas Resources: An Initial Assessment of 14 Regions Outside the United States.* Washington D.C.

What is claimed is:

1. A fracturing-fluid additive composition comprising bio-oil, wherein said fracturing-fluid additive composition contains from 56 wt % to 90 wt % water and from 10 wt % to 25 wt % carboxylic acids,
and wherein said bio-oil is produced by a process of:
(a) introducing biomass to a reactor operated under pyrolysis conditions to convert said biomass to a reaction mixture comprising condensable vapors, non-condensable gases, and solid biochar;
(b) removing at least some of said biochar from said reaction mixture, to produce an intermediate mixture comprising said condensable vapors and said non-condensable gases;
(c) introducing said intermediate mixture to at least one heat exchanger operated under effective conditions to condense said condensable vapors, thereby generating said bio-oil from said condensable vapors; and
(d) collecting said bio-oil.

2. The composition of claim 1, wherein said carboxylic acids include acetic acid.

3. The composition of claim 1, wherein said carboxylic acids include formic acid.

4. The composition of claim 1, wherein said composition comprises one or more biomass-derived aldehydes or ketones.

5. The composition of claim 1, wherein said composition comprises one or more biomass-derived phenols.

6. The composition of claim 1, wherein said composition comprises one or more biomass-derived alcohols.

7. The composition of claim 1, wherein said composition is substantially biodegradable.

8. A fracturing fluid comprising an additive composition containing a bio-oil, wherein said additive composition contains from 56 wt % to 90 wt % water and from 10 wt % to 25 wt % carboxylic acids,
and wherein said bio-oil is produced by a process of:
(a) introducing biomass to a reactor operated under pyrolysis conditions to convert said biomass to a reaction mixture comprising condensable vapors, non-condensable gases, and solid biochar;
(b) removing at least some of said biochar from said reaction mixture, to produce an intermediate mixture comprising said condensable vapors and said non-condensable gases;
(c) introducing said intermediate mixture to at least one heat exchanger operated under effective conditions to condense said condensable vapors, thereby generating said bio-oil from said condensable vapors; and
(d) collecting said bio-oil.

9. The fracturing fluid of claim 8, wherein said additive composition further comprises one or more biomass-derived compounds selected from the group consisting of aldehydes, ketones, furans, phenols, esters, alcohols, and combinations thereof.

10. The fracturing fluid of claim 8, said fracturing fluid further comprising a proppant.

11. The fracturing fluid of claim 10, wherein said proppant comprises biochar.

12. The fracturing fluid of claim 8, wherein said additive composition is a breaker within said fracturing fluid.

13. The fracturing fluid of claim 8, wherein said additive composition modifies the pH of said fracturing fluid.

14. The fracturing fluid of claim 8, wherein said additive composition is effective to stimulate flow of oil or gas within an oil or gas well by dissolving minerals, enlarging formation pores, initiating cracks, etching channels, and/or increasing permeability in rock.

15. The fracturing fluid of claim 8, wherein said additive composition is effective to stimulate flow of oil or gas within an oil or gas well by cleaning the well borehole, casing, and/or formation, or by removing filter cake buildup.

16. The fracturing fluid of claim 8, wherein said additive composition includes one or more compounds that inhibit metal oxide precipitation.

17. The fracturing fluid of claim 8, wherein said additive composition includes one or more compounds that inhibit the corrosion potential of said fracturing fluid.

18. The fracturing fluid of claim 8, wherein said additive composition includes one or more compounds that inhibit microbial growth within said fracturing fluid or at a contact surface disposed adjacent to said fracturing fluid.

19. The fracturing fluid of claim 8, wherein said additive composition is renewable and biodegradable.

20. The fracturing fluid of claim 8, wherein said additive composition reduces the chemical or physical potential for groundwater contamination associated with said fracturing fluid.

* * * * *